US006192452B1

(12) United States Patent
Bannister et al.

(10) Patent No.: US 6,192,452 B1
(45) Date of Patent: Feb. 20, 2001

(54) METHOD AND SYSTEM FOR AVOIDING DATA LOSS DUE TO CANCELLED TRANSACTIONS WITHIN A NON-UNIFORM MEMORY ACCESS SYSTEM

(75) Inventors: John Peyton Bannister, Austin; Gary Dale Carpenter, Pflugerville; Mark Edward Dean; David Brian Glasco, both of Austin; Richard Nicholas Iachetta, Jr., Pflugerville, all of TX (US)

(73) Assignee: International Business Machines Corporation, Armonk, NY (US)

( * ) Notice: Under 35 U.S.C. 154(b), the term of this patent shall be extended for 0 days.

(21) Appl. No.: 09/259,378

(22) Filed: Feb. 26, 1999

(51) Int. Cl.[7] .................................................. G06F 12/00
(52) U.S. Cl. ......................... 711/141; 711/118; 711/119; 711/145; 712/28
(58) Field of Search ................................... 711/118, 119, 711/141, 145; 712/28

(56) References Cited

U.S. PATENT DOCUMENTS

| 5,297,269 | * | 3/1994 | Donaldson et al. | 711/145 |
|---|---|---|---|---|
| 5,895,484 | * | 4/1999 | Arimilli et al. | 711/118 |
| 5,940,856 | * | 8/1999 | Arimilli et al. | 711/119 |
| 5,943,684 | * | 8/1999 | Arimilli et al. | 711/144 |
| 6,067,603 | * | 5/2000 | Carpenter et al. | 711/141 |
| 6,067,611 | * | 5/2000 | Carpenter et al. | 712/28 |
| 6,081,874 | * | 6/2000 | Carpenter et al. | 711/141 |
| 6,085,293 | * | 7/2000 | Carpenter et al. | 711/141 |
| 6,115,804 | * | 9/2000 | Carpenter et al. | 712/28 |

\* cited by examiner

*Primary Examiner*—John A. Follansbee
*Assistant Examiner*—Nabil El-Hady
(74) *Attorney, Agent, or Firm*—Casimer K. Salys; Felsman, Bradley, Vaden, Gunter & Dillon, LLP

(57) ABSTRACT

A method for avoiding data loss due to cancelled transactions within a non-uniform memory access (NUMA) data processing system is disclosed. A NUMA data processing system includes a node interconnect to which at least a first node and a second node are coupled. The first and the second nodes each includes a local interconnect, a system memory coupled to the local interconnect, and a node controller interposed between the local interconnect and a node interconnect. The node controller detects certain situations which, due to the nature of a NUMA data processing system, can lead to data loss. These situations share the common feature that a node controller ends up with the only copy of a modified cache line and the original transaction that requested the modified cache line may not be issued again with the same tag or may not be issued again at all. The node controller corrects these situations by issuing its own write transaction to the system memory for that modified cache line using its own tag, and then providing the data the modified cache line is holding. This ensures that the modified data will be written to the system memory.

8 Claims, 5 Drawing Sheets

READ is forwarded to a remote node

READ completes with modified intervention, but READ is cancelled at home node

WBC is generated to write data back to memory

METHOD AND SYSTEM FOR AVOIDING DATA LOSS DUE TO CANCELLED TRANSACTIONS WITHIN A NON-UNIFORM MEMORY ACCESS SYSTEM

BACKGROUND OF THE INVENTION

1. Technical Field

The present invention relates to a method and system for data processing in general, and in particular to a method and system for avoiding data loss within a computer system. Still more particularly, the present invention relates to a method and system for avoiding data loss due to cancelled transactions within a non-uniform memory access (NUMA) computer system.

2. Description of the Related Art

It is well-known in the computer arts that greater computer system performance can be achieved by harnessing the processing power of multiple individual processors in tandem. Multi-processor (MP) computer systems can be designed with a number of different topologies, of which various ones may be better suited for particular applications depending upon the performance requirements and software environment of each application. One of the most common MP computer topologies is a symmetric multi-processor (SMP) configuration in which multiple processors share common resources, such as a system memory and input/output (I/O) subsystem, which are typically coupled to a shared system interconnect. Such computer systems are said to be symmetric because all processors in an SMP computer system ideally have the same access latency with respect to data stored in the shared system memory.

Although SMP computer systems permit the use of relatively simple inter-processor communication and data sharing methodologies, SMP computer systems have limited scalability. In other words, while performance of a typical SMP computer system can generally be expected to improve with scale (i.e., with the addition of more processors), inherent bus, memory, and input/output (I/O) bandwidth limitations prevent significant advantage from being obtained by scaling a SMP beyond a implementation-dependent size at which the utilization of these shared resources is optimized. Thus, the SMP topology itself suffers to a certain extent from bandwidth limitations, especially at the system memory, as the system scale increases. SMP computer systems also do not scale well from the standpoint of manufacturing efficiency. For example, although some components can be optimized for use in both uniprocessor and small-scale SMP computer systems, such components are often inefficient for use in large-scale SMPs. Conversely, components designed for use in large-scale SMPs are impractical for use in smaller systems from a cost standpoint.

As a result, an MP computer system topology known as non-uniform memory access (NUMA) has emerged as an alternative design that addresses many of the limitations of SMP computer systems at the expense of some additional complexity. A typical NUMA computer system includes a number of interconnected nodes that each include one or more processors and a local "system" memory. Such computer systems are said to have a non-uniform memory access because each processor has lower access latency with respect to data stored in the system memory at its local node than with respect to data stored in the system memory at a remote node. NUMA systems can be further classified as either non-coherent or cache coherent, depending upon whether or not data coherency is maintained between caches in different nodes. The complexity of cache coherent NUMA (CC-NUMA) systems is attributable in large measure to the additional communication required for hardware to maintain data coherency not only between the various levels of cache memory and system memory within each node but also between cache and system memories in different nodes. NUMA computer systems do, however, address the scalability limitations of conventional SMP computer systems since each node within a NUMA computer system can be implemented as a smaller SMP system. Thus, the shared components within each node can be optimized for use by only a few processors, while the overall system benefits from the availability of larger scale parallelism while maintaining relatively low latency.

In designing a scalable cache coherent NUMA system, data coherency issues that do not exist in simpler SMP designs must be addressed. For example, in a single bus MP computer system, data loss will not occur when a transaction is cancelled on the system bus. Data loss can be thought of as a set of circumstances during which the only valid copy of a data element (such as a cache line) is lost from any or all caches or memories in the system. The cache coherency protocol of an SMP system is designed to prevent such a loss from occurring. If, for example, a read transaction is "retried" by a processor in an SMP system, the "retry" is visible on to all devices on the bus; the requester of the data, the provider of the data and all snoopers, before the data is actually sourced to the bus. This ensures that the data will not be discarded, and hence "lost," by a device which may have the only valid copy. It also ensures that none of the caches in the system will change their state as they would have done if the data had been provided. A single bus MP could also maintain data coherency with the existence of a protocol mechanism for "cancelling" a transaction. A transaction is "cancelled" when a device requests data but, before the data can be provided, the requester indicates that the data is no longer wanted. Transactions can be cancelled by devices other than the device that originated the transaction, for example a memory controller whose buffers are full. When a third party cancels the transaction in this way, the requester will re-issue the transaction only if the data is still required. The valid copy of data then is neither provided nor removed from the memory where it is resident. Although transaction cancellation is not a typical feature of an SMP system, one could include a cancellation mechanism without sacrificing coherency because all snoopers have simultaneous visibility to the transaction on the system bus.

Due to the potentially long latency of some transactions, a high performance NUMA system may find greater utility for a protocol mechanism to cancel a previously issued transaction. In a specific circumstance, a NUMA system may use a cancellation method to nullify a speculative fetch that is no longer needed. This would be the right thing to do because the processor should not have to waste resource to keep such a transaction pending, and to transfer the data would be a waste of valuable bus bandwidth. However, in a NUMA system, situations can occur transactions in which data may be lost during transaction cancellation unless measures are taken to detect and remedy such situations. Consider the case of a READ transaction issued to a remote processing node which is successful at the node which provides the data, but which is cancelled at the receiving node while the data from the remote node is still in transit. This may result in a loss of the only valid copy of the data, and hence the loss of data coherency. In the case described above, data loss results when the caches at the node providing the data change state before the transaction cancellation can be transmitted to the remote processing node. The cancellation cannot prevent the change of cache state as would happen in an SMP system because the cancellation originates on a physically different bus than that to which the read data is provided. The read transaction can complete successfully on one bus, triggering the state change of caches at that bus, before the transaction is cancelled at the node receiving the data, or before the cancellation can be communicated between the physically separate busses. Under these circumstances, the controller interfacing between these busses can be left with the only valid copy of data, in particular when the data is a modified copy of a cache line which has not yet been written to memory. Once the transaction is cancelled, a read request may never be issued for the data being held by the node controller, and as a result, the data will be lost, and memory will be inconsistent. This problem can occur in the course of any data transaction that causes modified data to be written to memory through the node controller. Consequently, it is necessary to provide a method and system for detecting and correcting these situations, avoiding loss of data and coherency.

SUMMARY OF THE INVENTION

A non-uniform memory access (NUMA) data processing system includes a node interconnect to which at least a first node and a second node are coupled. The first and the second nodes each includes a local interconnect, a system memory coupled to the local interconnect, and a node controller interposed between the local interconnect and a node interconnect. The node controller detects certain situations which, due to the nature of a NUMA data processing system, can lead to data loss. These situations share the common feature that a node controller ends up with the only copy of a modified cache line and the original transaction that requested the modified cache line may not be issued again with the same tag or may not be issued again at all. The node controller corrects these situations by issuing its own write transaction to the system memory for that modified cache line using its own tag, and then providing the data the modified cache line is holding. This ensures that the modified data will be written to the system memory.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

I. NUMA SYSTEM

A. System Overview

Figure 1:
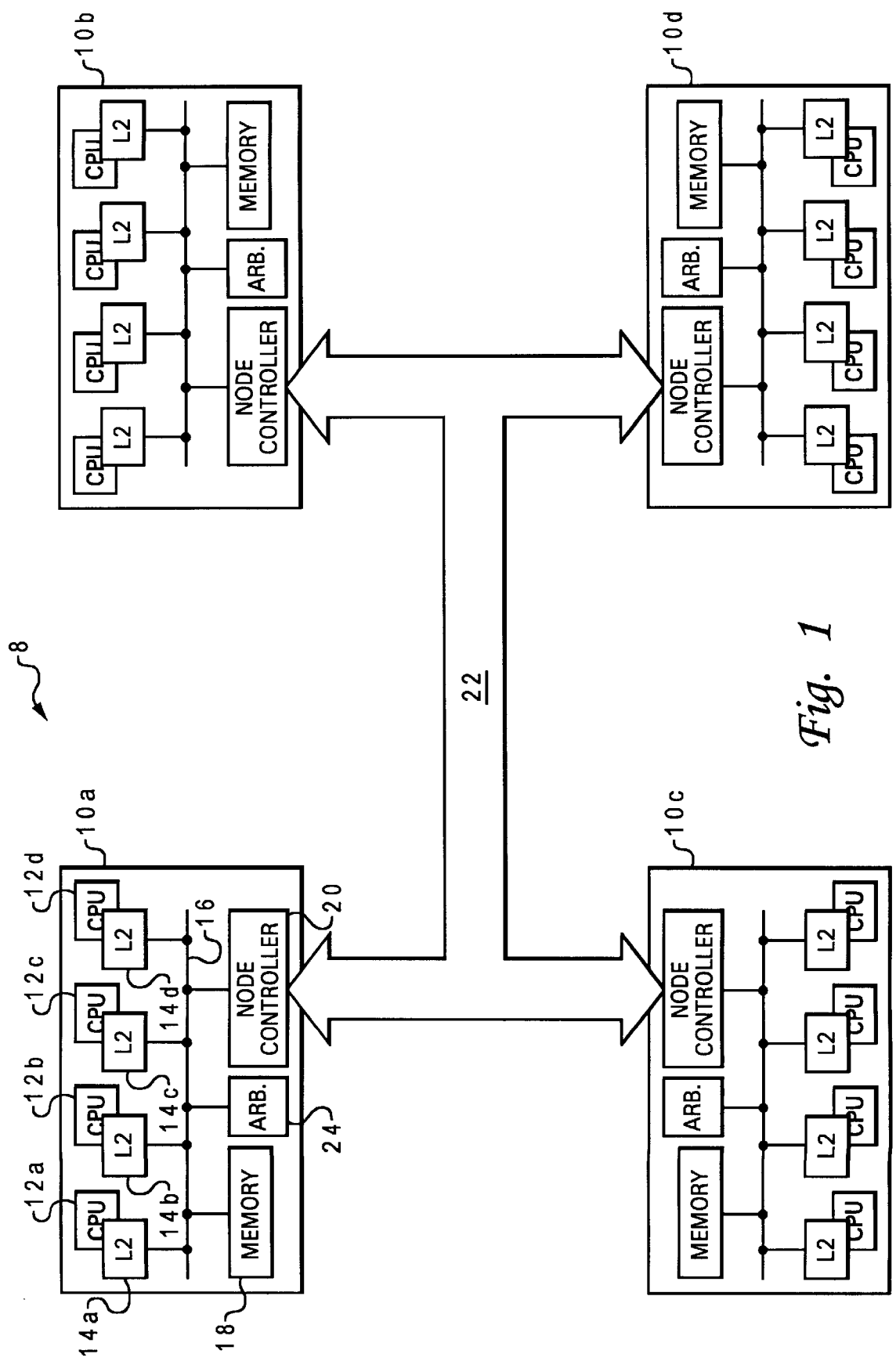
FIG. 1 is a block diagram of a non-uniform memory access (NUMA) computer system in accordance with a preferred embodiment of the present invention.

With reference now to the figures and in particular with reference to FIG. 1, there is illustrated a block diagram of a non-uniform memory access (NUMA) computer system in accordance with an illustrative embodiment of the present invention. The depicted embodiment can be realized, for example, as a workstation, server, or mainframe computer. As shown, NUMA computer system 8 includes a number (N) of processing nodes 10a–10d, which are interconnected by node interconnect 22. Processing nodes 10a–10d each include at least one, and up to M, processors 12. Processors 12a–12d are preferably identical and may comprise a processor within the PowerPC™ line of processors available from the International Business Machines (IBM) Corporation of Armonk, N.Y. In addition to the registers, instruction flow logic and execution units utilized to execute program instructions, each of processors 12a–12d also includes an on-chip level one (L1) cache (not shown), which together with a respective one of level two (L2) caches 14a–14d is utilized to stage data to the associated processor 12 from system memories 18. In other words, the L1 caches and L2 caches 14a–14d function as intermediate storage between the system memories 18 and processors 12 that temporarily buffer data that are likely to be accessed by the associated processor 12. L2 caches 14 typically have a much larger storage capacity than the L1 caches, but at a longer access latency. For example, L2 caches 14a–14d may have a storage capacity of 1–16 megabytes (MB), while the on-chip L1 caches may have a storage capacity of 8–32 kilobytes. Although L2 caches 14a–14d are illustrated in FIG. 1 as external to processors 12, it should be understood that L2 caches 14a–14d could alternatively be incorporated within the associated processor 12 as an additional level of on-chip cache memory. Furthermore, it should be understood that one or more additional levels of cache memory (L3, L4, etc.) could be utilized to provide additional data storage. In the following discussion, each processor 12 and its associated cache hierarchy (L1, L2, etc.) is considered to be a single snooper.

As shown, processing nodes 10a–10d further include a respective node controller 20, which, together with system memory 18 and L2 caches 14a–14d, is coupled to local interconnect 16. Each node controller 20 serves as a local agent for remote processing nodes 10 by performing at least two functions. First, each node controller 20 snoops the associated local interconnect 16 and facilitates the transmission of local communication transactions to remote processing nodes 10. Second, each node controller 20 snoops communication transactions on node interconnect 22 and masters relevant communication transactions on the associated local interconnect 16. Communication on each local interconnect 16 is controlled by an arbiter 24. As discussed further below, arbiters 24 regulate access to local interconnects 16 based on bus request signals generated by processors 12 and compile coherency responses for snooped communication transactions on local interconnects 16.

Of course, NUMA computer system 8 can further include additional devices that are not necessary for an understanding of the present invention and are accordingly omitted in order to avoid obscuring the present invention. For example, each node 10 may also support I/O devices (e.g., a display device, keyboard, or graphical pointer), non-volatile storage for storing an operating system and application software, and serial and parallel ports for connection to networks or attached devices.

B. Memory Organization

All of processors 12 in NUMA computer system 8 share a single physical memory space, meaning that each physical address is associated with only a single location in one of system memories 18. Thus, the overall contents of the system memory, which can generally be accessed by any processor 12 in NUMA computer system 8, can be viewed as partitioned between the four system memories 18. For example, for the illustrative embodiment of the present invention shown in FIG. 1, processors 12 address a 16 gigabyte address space including both a general purpose memory area and a reserved area. The general purpose memory area is divided into 500 megabyte segments, with each of the four processing nodes 10 being allocated every fourth segment. The reserved area, which may contain approximately two gigabyte, includes system control and peripheral memory and I/O areas that are each allocated to a respective one of processing nodes 10.

For purposes of the present discussion, the processing node that stores a particular datum in its system memory 18 is said to be the home node for that datum; conversely, other processing nodes are said to be remote nodes with respect to the particular datum.

C. Memory Coherency

Because data stored within each system memory 18 can be requested, accessed, and modified by any processor 12 within NUMA computer system 8, NUMA computer system 8 implements a cache coherency protocol to maintain coherency both between caches in the same processing node and between caches in different processing nodes. Thus, NUMA computer system 8 is properly classified as a CC-NUMA computer system. The cache coherence protocol that is implemented is implementation-dependent and may comprise, for example, the well-known Modified, Exclusive, Shared, Invalid (MESI) protocol or a variant thereof. Hereafter, it will be assumed that L1 caches, L2 caches 14, and arbiters 24 implement the conventional MESI protocol, of which node controllers 20 recognize the M, S and I states and consider the E state to be merged into the M state for correctness. That is, node controllers 20 assume that data held exclusively by a remote cache has been modified, whether or not the data has actually been modified.

D. Interconnect Architecture

Local interconnects 16 and node interconnect 22 can each be implemented with any bus-based broadcast architecture, switch-based broadcast architecture, or switch-based non-broadcast architecture. However, in an illustrative embodiment, at least node interconnect 22 is implemented as a switch-based non-broadcast interconnect governed by the 6xx communication protocol developed by IBM Corporation. Local interconnects 16 and node interconnect 22 permit split transactions, meaning that no fixed timing relationship exists between the address and data tenures comprising a communication transaction and that data packets can be ordered differently than the associated address packets. The utilization of local interconnects 16 and node interconnect 22 is also preferably enhanced by pipelining communication transactions, which permits a subsequent communication transaction to be sourced prior to the master of a previous communication transaction receiving coherency responses from each recipient.

Regardless of the type or types of interconnect architecture that are implemented, at least three types of "packets" (packet being used here generically to refer to a discrete unit of information)—address, data, and coherency response—are utilized to convey information between processing nodes 10 via node interconnect 22 and between snoopers via local interconnects 16. Referring now to Tables I and II, a summary of relevant fields and definitions are given for address and data packets, respectively.

TABLE I

| Field Name | Description |
| --- | --- |
| Address <0:7> | Modifiers defining attributes of a communication transaction for coherency, write thru, and protection |
| Address <8:15> | Tag used to identify all packets within a communication transaction |
| Address <16:63> | Address portion that indicates the physical, virtual or I/O address in a request |
| AParity <0:2> | Indicates parity for address bits <0:63> |
| TDescriptors | Indicate size and type of communication transaction |

TABLE II

| Field Name | Description |
| --- | --- |
| Data <0:127> | Data for read and write transactions |
| Data parity <0:15> | Indicates parity for data lines <0:127> |
| DTag <0:7> | Tag used to match a data packet with an address packet |
| DValid <0:1> | Indicates if valid information is present in Data and DTag fields |

As indicated in Tables I and II, to permit a recipient node or snooper to determine the communication transaction to which each packet belongs, each packet in a communication transaction is identified with a transaction tag. Those skilled in the art will appreciate that additional flow control logic and associated flow control signals may be utilized to regulate the utilization of the finite communication resources.

Within each processing node 10, status and coherency responses are communicated between each snooper and the local arbiter 24. The signal lines within local interconnects 16 that are utilized for status and coherency communication are summarized below in Table III.

TABLE III

| Signal Name | Description |
| --- | --- |
| AStatOut <0:1> | Encoded signals asserted by each bus receiver to indicate flow control or error information to arbiter |
| AStatIn <0:1> | Encoded signals asserted by arbiter in response to tallying the AStatOut signals asserted by the bus receivers |
| ARespOut <0:2> | Encoded signals asserted by each bus receiver to indicate coherency information to arbiter |
| ARespIn <0:2> | Encoded signals asserted by arbiter in response to tallying the ARespOut signals asserted by the bus receivers |

Status and coherency responses transmitted via the AResp and AStat lines of local interconnects 16 preferably have a fixed but programmable timing relationship with the associated address packets. For example, the AStatOut votes, which provide a preliminary indication of whether or not each snooper has successfully received an address packet transmitted on local interconnect 16, may be required in the second cycle following receipt of the address packet. Arbiter 24 compiles the AStatOut votes and then issues the AStatIn vote a fixed but programmable number of cycles later (e.g., 1 cycle). Possible AStat votes are summarized below in Table IV.

TABLE IV

| AStat vote | Meaning |
| --- | --- |
| Null | Idle |
| Ack | Transaction accepted by snooper |
| Error | Parity error detected in transaction |
| Retry | Retry transaction, usually for flow control |

Following the AStatIn period, the ARespOut votes may then be required a fixed but programmable number of cycles (e.g., 2 cycles) later. Arbiter 24 also compiles the ARespOut votes of each snooper and delivers an ARespIn vote, preferably during the next cycle. The possible AResp votes preferably include the coherency responses listed in Table V, which lists such AResp votes in order of descending priority.

TABLE V

| Coherency responses | Meaning |
| --- | --- |
| Retry | Source of request must retry transaction - usually for flow control reasons |
| Modified intervention | Line is modified in cache and will be sourced from cache to requestor |
| Shared intervention | Line is unmodified in cache (and possibly shared) and will be sourced from cache to requestor |
| ReRun | Snooped request has long latency and source of request will be instructed to reissue transaction at a later time |
| Shared | Line is held shared in cache |
| Null | Line is invalid in cache |

The ReRun AResp vote, which is usually issued by a node controller 20, indicates that the snooped request has a long latency (e.g., the request will be serviced by a processor 12 or system memory 18 at a remote processing node) and that the source of the request will be instructed to reissue the transaction at a later time. Thus, in contrast to a Retry AResp vote, a ReRun makes the recipient of a transaction that voted ReRun (and not the originator of the transaction) responsible for causing the communication transaction to be reissued at a later time.

Figure 2A:
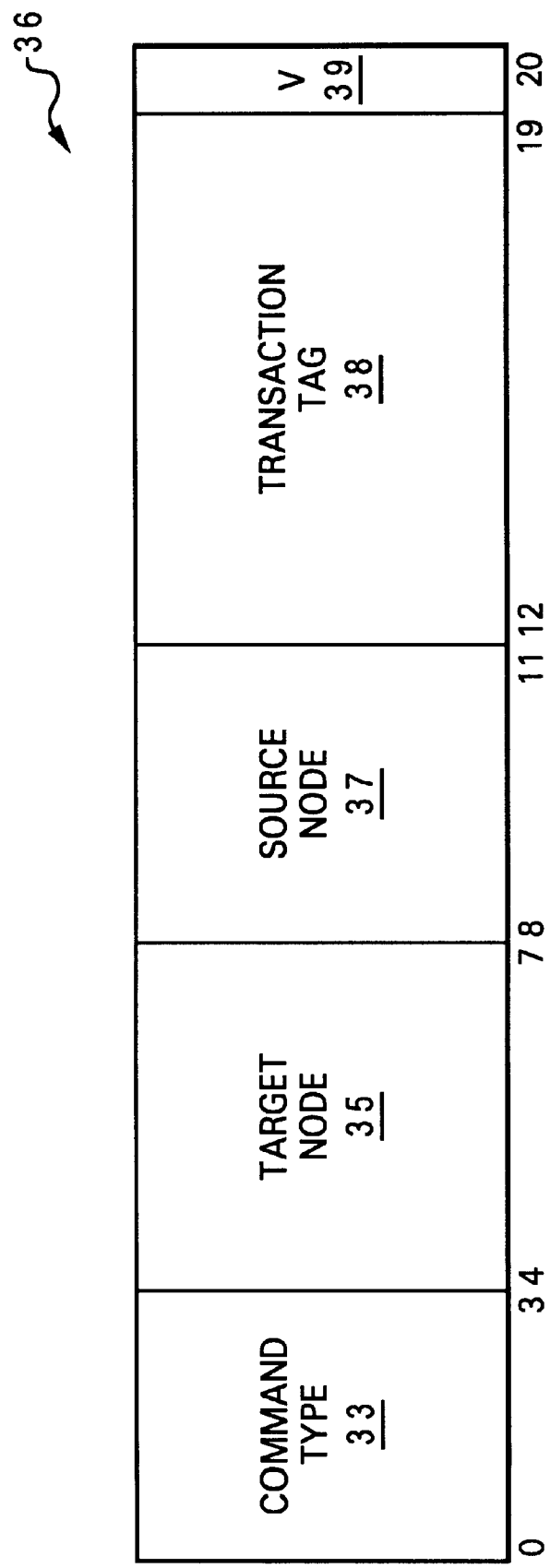
FIG. 2a depicts an illustrative embodiment of an I-command.

Referring now to FIG. 2a, there is illustrated an exemplary embodiment of an I-command that is utilized to communicate the responses and commands between node controllers 20 over interconnect 22. As shown, an I-command 36 includes five fields: a command type field 33, a target node field 35, a source node field 37, a transaction tag field 38, and a valid (V) field 39. Command type field 33 provides an encoded indication of the type of I-command 36. Some of the possible I-commands that can be encoded within command type field 33 are listed below in Table VI.

TABLE VI

| I-command groups | I-command types | Meaning |
| --- | --- | --- |
| commands | 3rd node run | Run buffered transaction at third (target) node |
| | Error | Error detected in transaction |
| | Reissue | Reissue transaction to source node |
| coherency responses | Retry | Retry transaction - usually for flow control reasons |
| | Modified intervention | Line is modified in cache and will be sourced to target node |
| | Shared | Line is held shared in cache |
| | Null | Line is invalid in cache |

For each type of I-command, the recipient is specified in target node field 35, the sending node is specified in source node field 37, and the transaction to which the I-command relates is specified within transaction tag field 38. The validity of I-command 36 is indicated by valid (V) field 39.

E. Node Controller

Figure 2B:
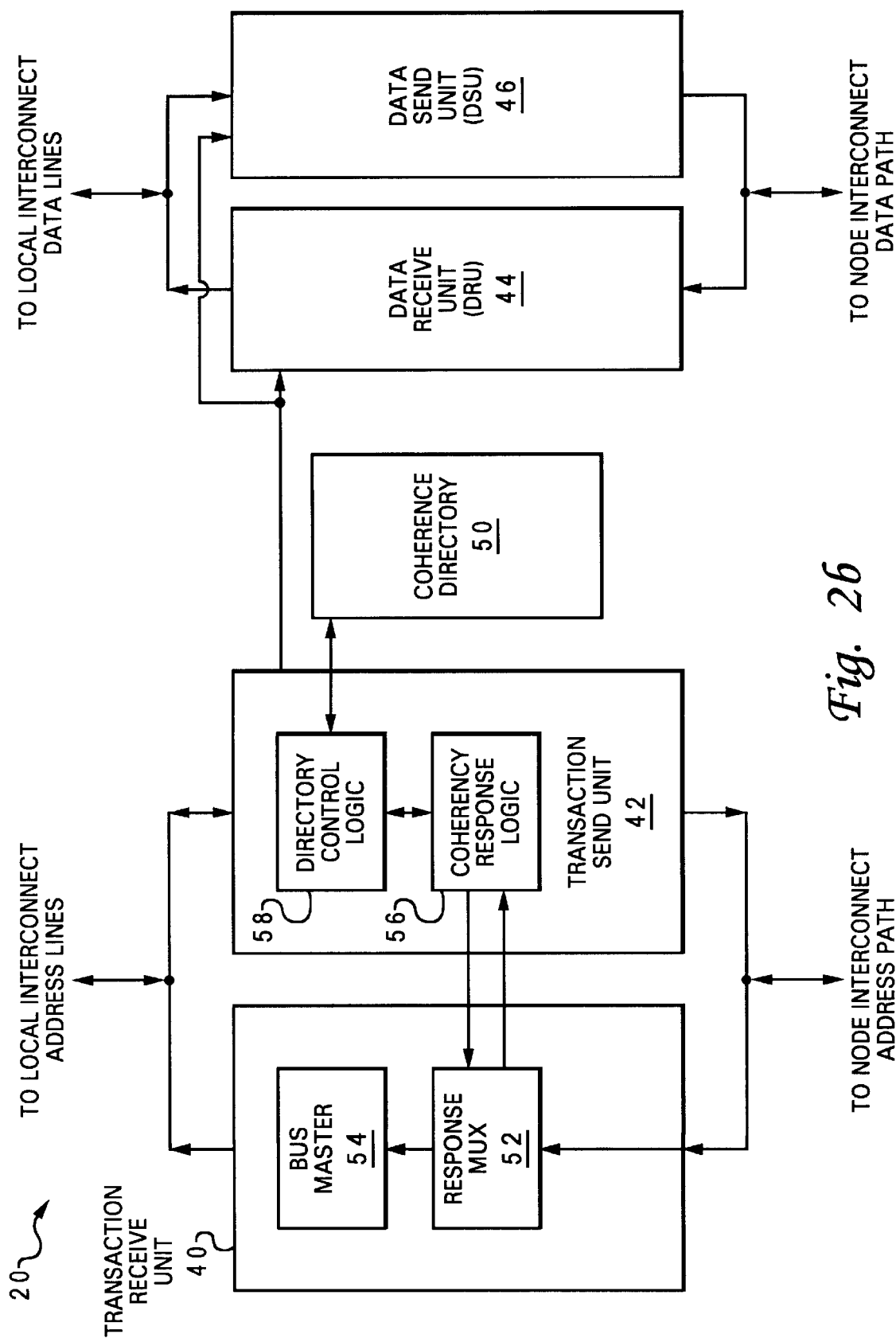
FIG. 2b is a more detailed block diagram of the node controller shown in FIG. 1.

Referring now to FIG. 2b, there is illustrated a more detailed block diagram of a node controller 20 in NUMA computer system 8 of FIG. 1. As shown in FIG. 2b, each node controller 20, which is coupled between a local interconnect 16 and node interconnect 22, includes transaction receive unit 40, transaction send unit 42, a data receive unit (DRU) 44, and a data send unit (DSU) 46. Transaction receive unit 40, transaction send unit 42, DRU 44 and DSU 46 can be implemented, for example, with field programmable gate arrays (FPGAs) or application specific integrated circuits (ASICs). As indicated, the address and data paths through node controller 20 are bifurcated, with address signals being processed by transaction receive unit 40 and transaction send unit 42 and data signals being processed by DSU 44 and DRU 46.

Transaction receive unit 40, which is so designated to indicate transaction flow off of node interconnect 22, is responsible for receiving I-commands from other nodes via an I-command channel, accepting transactions from a shared address bus of node interconnect 22, issuing transactions on local interconnect 16, and forwarding responses to transaction send unit 42. Transaction receive unit 40 includes response multiplexer 52, which receives transactions from node interconnect 22 and passes selected transactions to both bus master 54 and coherency response logic 56 within transaction send unit 42. In response to receipt of a communication transaction from response multiplexer 52, bus master 54 can initiate a communication transaction on its local interconnect 16 that is the same as the received communication transaction or generated for the directory control within the TSU for directory maintenance such as evictions.

Transaction send unit 42, which as indicated by its nomenclature is a conduit for transactions flowing onto node interconnect 22, interacts with transaction receive unit 40 to process memory request transactions and issues commands to DRU 44 and DSU 46 to control the transfer of data between local interconnect 16 and node interconnect 22. Transaction send unit 42 also implements the selected (i.e., MSI) coherency protocol for node interconnect 22 with coherency response logic 56 and maintains coherence directory 50 with directory control logic 58.

TABLE VI

| Coherence directory state | Possible state(s) in local cache | Possible state(s) in remote cache | Meaning |
| --- | --- | --- | --- |
| Modified (M) | I | M, E, or I | Cache line may be modified at a remote node |
| Shared (S) | S or I | S or I | Cache line may be held non-exclusively at a remote node |
| Invalid (I) | M, E, S, or I | I | Cache line is not held by any remote node |
| Pending-Shared | S or I | S or I | Cache line is in the process of being invalidated at remote nodes |
| Pending-Modified | I | M, E, or I | Cache line, which may be modified at a remote node, is in the process of being written back to a system memory at the home node, possibly with invalidation at the remote node |

Coherence directory 50 stores indications of the system memory addresses of data (e.g., cache lines) checked out to caches in remote nodes for which the local processing node is the home node. The address indication for each datum is stored in association with an identifier of each remote processing node having a copy of the datum and the coherency status of the datum at each such remote processing node. Possible coherency states for entries in coherency directory 50 are summarized in Table VI. As indicated in Table VI, the knowledge of the coherency states of cache lines held by remote processing nodes is imprecise. This imprecision is due to the fact that a cache line held remotely can make a transition from S to I, from E to I, or from E to M without notifying the node controller 20 of the home node.

II. LOST DATA PROBLEM

Figure 3B:
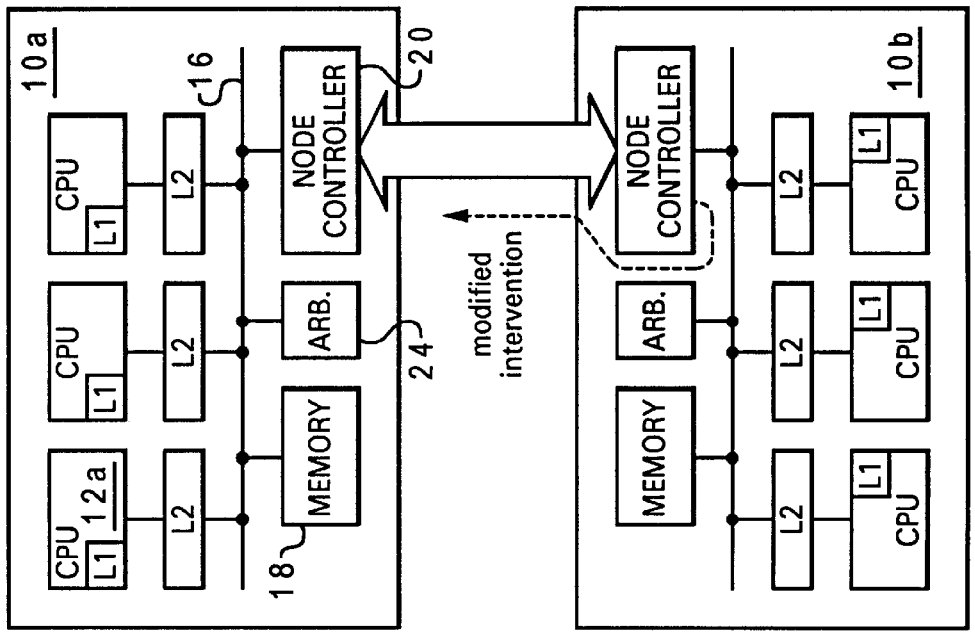
FIGS. 3a and 3b are an illustrative example of a lost data situation caused by a cancelled transaction within a NUMA computer system.
Figure 3A:
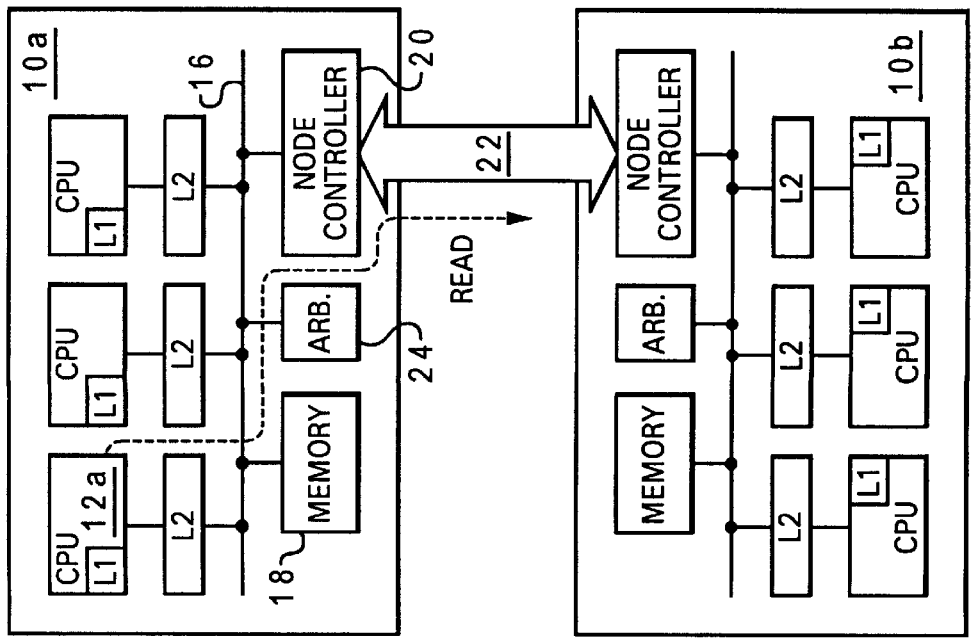

Referring now to FIGS. 3a and 3b, there is illustrated an example of a lost data situation caused by a cancelled transaction within a NUMA computer system. In FIG. 3a, a READ request for a cache line made by a processor 12a of a home node 10a is forwarded to a remote node 10b in which the cache line is held in a Modified state. The READ request then receives a Modified-intervention response at remote node 10b. Modified-intervention is a coherency vote that allows one cache memory to provide modified data directly to one or more other cache memories, taking all cache memories that received the modified data to a Shared state, if the request was a read-only request. In MESI and MSI protocols, a Shared state implies that all cache memories are consistent with the copy of the line in system memory at home node 10a. Thus, the cache memory, which held the line modified, in remote node 10b proceed to a Shared state, but since the cache line's home node is node 10a, the system memory in home node 10a must be updated. The Modified-intervention response along with modified data are subsequently sent back to home node 10a in which a ReRun transaction is issued, as shown in FIG. 3b. When processor 12a in home node 10a reissues the transaction, the transaction is cancelled by an agent at home node 10a. One of the many reasons for the cancellation of the ReRun transaction may be because the transaction was a speculative READ that was deemed no longer necessary. In the meantime, the cache memories in remote node 10b may have silently discarded the cache line as it is now in a shared state and the only valid copy of the cache line is residing in node controller 20 with no way to get to local memory 18. This data will be lost unless the above-mentioned situation is detected and remedied. Another problem associated with the above-mentioned situation is that the cache coherency directory within node controller 20 will not be cleared until the data transfer has occurred, which could cause a deadlock due to the collision detection protocol of the bus after the data has been lost.

III. SOLUTION TO THE LOST DATA PROBLEM

To resolve the lost data problem, the cache coherency directory within node controller 20 must be able to observe all the above-mentioned events. This is possible with the information to which node controller 20 has visibility. Node controller 20 must also buffer all transactions until the transactions are cleared from the coherency response voting window. If node controller 20 detects a cancellation of a ReRun'd transaction for which the node controller is voting Modified-intervention, then the above-mentioned lost data scenario is said to have occurred. A NUMA computer system typically provides an indication, such as an R-bit attribute with the address of the transaction to indicate what kind of transaction that is. For example, R=0 represents an original transaction and R=1 represents a transaction that has been ReRun'd and is being re-issued due to a ReRun request.

Once node controller 20 detects the lost data scenario, node controller 20 must resolve the lost data scenario as follows. Node controller 20 must generate a request on local bus 16 that will allow the modified data to be written back to local memory 18. Since node controller 20 holds all previous transactions until the transactions pass the Response phase, node controller 20 can generate a Write-Back-Clean (WBC) bus transaction to write the data back to local memory 18. Node controller 20 must use a tag in the tag space that node controller 20 owns. The original tag cannot be used because the processor which owns the tag may use the tag again or another bus master may be confused by the same tag. Node controller 20 can use the identification (ID) of the pending buffer, the node ID, and its own bus-master ID to generate an unique tag.

When node controller 20 is granted the bus, node controller 20 generates the WBC transaction with the new tag and the R bit is set to "1." Node controller 20 also provides the data for the WBC that it holds in its data buffer. The tag for the data is changed to match the new transaction tag. If node controller 20 is split between separate Address and Data units, the data packet residing in the data unit must also be retagged with the new tag. This is accomplished with a command that passes both the old tag and new tag to the data unit. Until the data is written to memory, the coherency mechanism in node controller 20 must protect the coherency of this cache line by retrying transactions for the cache line. Node controller 20 will not retry its own WBC transaction because the R-bit is set to "1." Once the WBC request has completed, the entry will be deleted from the pending buffer and the directory state will be updated.

Figure 4A:
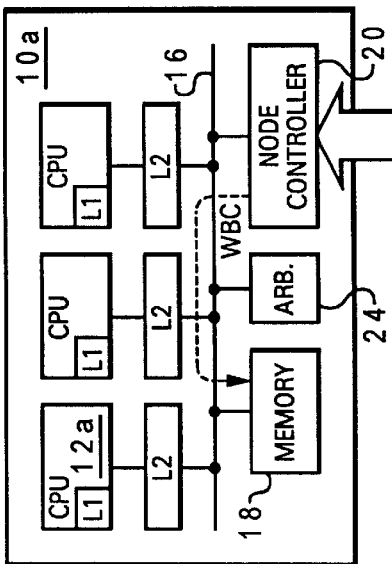
FIGS. 4a, 4b and 4c are an illustrative example of a solution to the lost data situation caused by a cancelled transaction, in accordance with a preferred embodiment of the present invention.
Figure 4A:
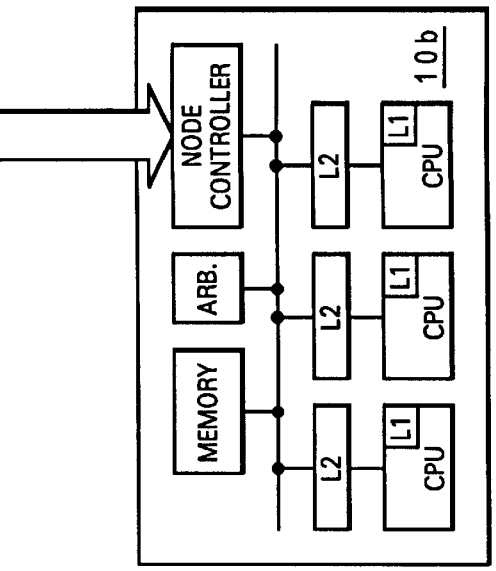
Figure 4B:
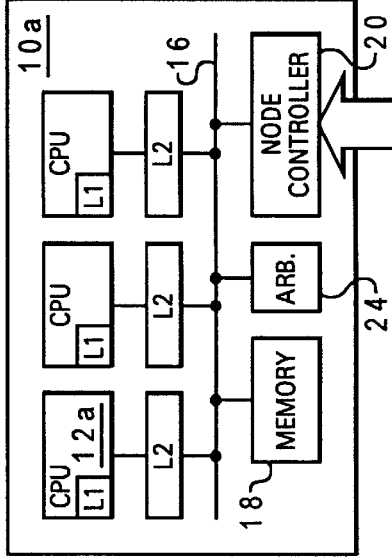
Figure 4B:
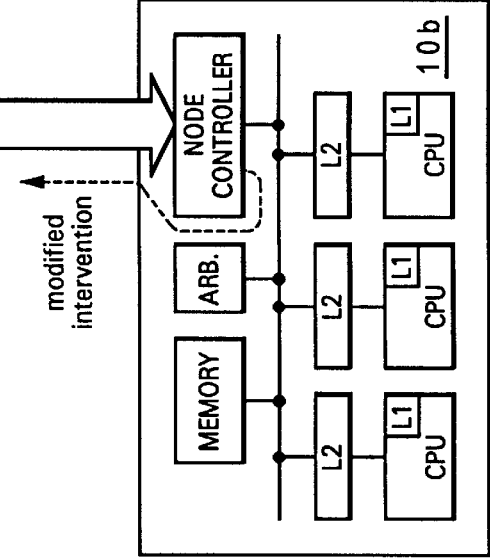
Figure 4C:
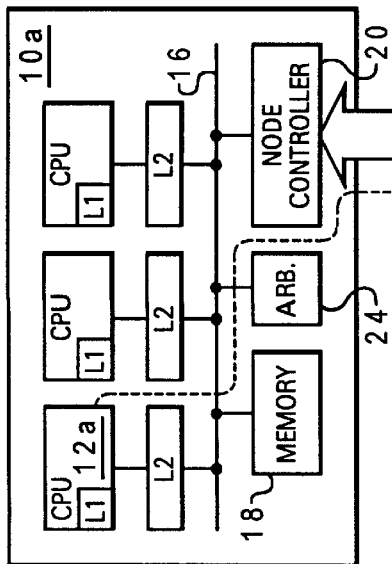
Figure 4C:
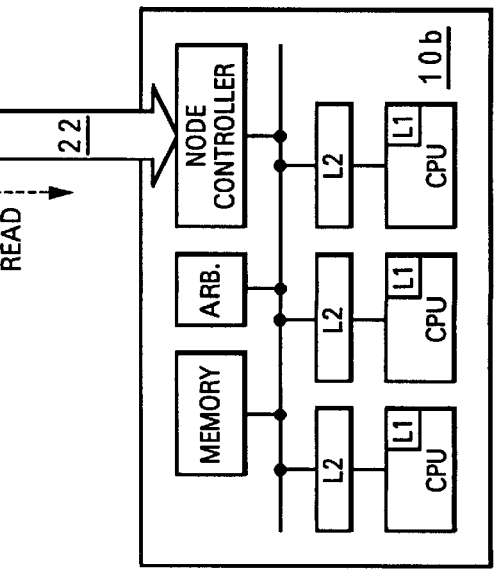

With reference now to FIGS. 4a, 4b and 4c, there is illustrated an example of a solution to the lost data situation caused by a cancelled transaction, in accordance with an illustrated embodiment of the present invention. As shown in FIG. 4a, a READ request at home node 10a is forwarded to remote node 10b where the modified data resides. The READ request receives the vote of Modified-intervention at remote node 10b. Remote node 10b then sends the Modified-intervention vote and the modified data to home node 10a, as shown in FIG. 4b. When processor 12a in home node 10a reissues the R=1 transaction as a result of the ReRun Request from node controller 20, home node 10a issues a vote of Retry, thus cancelling the transaction. Node controller 20 is able to observe that the lost data scenario has occurred. Node controller 20 then generates a new tag, as described above, and issues a WBC request with R=1. The coherence mechanism within node controller 20 allows the WBC request to complete as if the WBC request were the ReRun of a locally generated WBC request, as shown in FIG. 4c. As a result, the data in local memory 18 is now valid.

As has been described, the present invention provides an improved method for avoiding lost data due to cancelled transactions within a NUMA computer system.

While the invention has been particularly shown and described with reference to an illustrative embodiment, it will be understood by those skilled in the art that various changes in form and detail may be made therein without departing from the spirit and scope of the invention.

What is claimed is:

1. A method for avoiding lost data due to a canceled transaction within a non-uniform memory access (NUMA) computer system, wherein said NUMA computer system includes at least two nodes coupled to an interconnect and each of said at least two nodes includes a local system memory, said method comprising the steps of:

in response to a data accessing request from a home node to a remote node where modified data resides, wherein the data-accessing request includes any transaction that will cause the modified data to be written to said local system memory located in said home node, sending a Modified-intervention vote along with said modified data from said remote node to said home node;

afterwards, in response to a processor located at said home node reissuing a data accessing request as a result of a Re-issue Request from a node controller located at said home node, canceling said re-issued data accessing request from said home node; and in response to the cancellation of said re-issued data accessing request, issuing a writeback request by said node controller to deliver said modified data from said node controller to said local system memory located in said home node.

2. The method according to claim 1, wherein said reissued data-accessing request transaction has a Re-issue indicator bit set.

3. The method according to claim 1, wherein said writeback request is a line writeback request.

4. The method according to claim 1, wherein said step of issuing a writeback request is performed in response to said step of sending a Modified-intervention and said step of issuing a cancellation vote.

5. A non-uniform memory access (NUMA) computer system capable of avoiding lost data due to a canceled transaction, wherein said NUMA computer system includes at least two nodes coupled to an interconnect and each of said at least two nodes includes a local system memory, the NUMA computer system comprising:

means for sending a Modified-intervention vote along with a modified data from a remote node to a home node, in response to a data accessing request from said home node to said remote node where modified data resides, wherein the data-accessing request includes any transaction that will cause the modified data to be written to said local system memory located in said home node;

means for canceling a re-issued data accessing request from said home node, in response to a processor located at said home node reissuing said data accessing request as a result of a Re-issue Request from a node controller located at said home node; and means for issuing a writeback request by said node controller to deliver said modified data from said node controller to said local system memory located in said home node, in response to the cancellation of said re-issued data accessing request.

6. The NUMA computer system according to claim 5, wherein said reissued data-accessing request transaction has a Reissue indicator bit set.

7. The NUMA computer system according to claim 5, wherein said writeback request is a line writeback request.

8. The NUMA computer system according to claim 5, wherein said means for issuing a writeback request is performed in response to a sending of a Modified-intervention and an issuance of a cancellation vote.

* * * * *